United States Patent [19]

Lasko

[11] Patent Number: 5,088,194
[45] Date of Patent: Feb. 18, 1992

[54] FLUID DISTRIBUTION SYSTEM, AND APPARATUS AND METHOD FOR MAKING SAME

[76] Inventor: John A. Lasko, Box 737, 52 North Hill Rd., North Branford, Conn. 06471

[21] Appl. No.: 531,046

[22] Filed: May 31, 1990

Related U.S. Application Data

[63] Continuation-in-part of Ser. No. 335,950, Apr. 10, 1989, abandoned.

[51] Int. Cl.$^5$ .................. B21D 41/02; B21D 39/04
[52] U.S. Cl. ................... 29/890.148; 29/522.1
[58] Field of Search ......... 29/522.1, 890.141, 890.148, 29/890.149, 523, 524; 285/197, 222; 72/342

[56] References Cited

U.S. PATENT DOCUMENTS

| | | | |
|---|---|---|---|
| 1,801,171 | 4/1931 | Mueller et al. | |
| 1,823,549 | 9/1931 | Kendall | |
| 1,936,805 | 11/1933 | Taylor | 285/111 |
| 1,966,403 | 7/1934 | Durham | 285/106 |
| 2,015,246 | 9/1935 | Taylor | 285/106 |
| 2,463,006 | 3/1949 | Vander Clute | 285/106 |
| 2,915,324 | 12/1959 | Jackson | 285/150 |
| 2,954,604 | 10/1960 | Ramey | 29/421 |
| 3,220,098 | 11/1965 | Arbogast | 29/890.148 |
| 3,289,287 | 12/1966 | Guritz | 285/222 X |
| 3,516,692 | 6/1970 | Albrecht | 285/156 |
| 3,841,667 | 10/1974 | Sands | 285/222 X |
| 3,989,282 | 11/1976 | Zimmerman | 285/222 |
| 4,106,322 | 8/1978 | Moshinin et al. | 29/890.148 X |
| 4,541,656 | 9/1985 | Lasko | 285/286 |
| 4,641,862 | 2/1987 | Gardiner | 285/222 X |
| 4,654,942 | 4/1987 | Rush et al. | 285/197 X |
| 4,676,088 | 6/1987 | Okada et al. | 29/890.148 X |
| 4,770,446 | 9/1988 | Keller | 285/222 X |

FOREIGN PATENT DOCUMENTS

| | | | |
|---|---|---|---|
| 527182 | 10/1957 | Italy | 285/222 |
| 131563 | 10/1979 | Japan | 29/890.148 |
| 6410074 | 3/1966 | Netherlands | 285/222 |
| 398366 | 9/1933 | United Kingdom | 285/222 |

OTHER PUBLICATIONS

Article "How to Weld Pipe", The Linde Air Products Company, NY, p. 18, FIG. 42, 44, 1943.

Primary Examiner—Timothy V. Eley
Assistant Examiner—Peter Dungba Vo
Attorney, Agent, or Firm—H. Gibner Lehmann; K. Gibner Lehmann

[57] ABSTRACT

A weldless and solderless fluid distribution piping system incorporating solely mechanical retention of one or more inlet/outlet fittings in holes in the side wall of a pipe. In each case, the fitting has at one end a fishmouth configuration and an annular bead, and this end end is first inserted into the hole in the pipe and the bead thereafter forcibly expanded into tight mechanical and sealing relationship with the edges of the hole. A deformable and resilient sealing gasket can optionally be interposed between the fitting and pipe to provide an improved seal, if desired. Novel apparati and a method for attaching such fittings to a pipe are also disclosed.

5 Claims, 4 Drawing Sheets

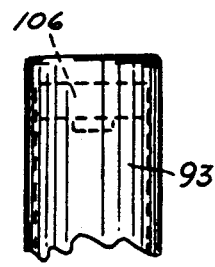
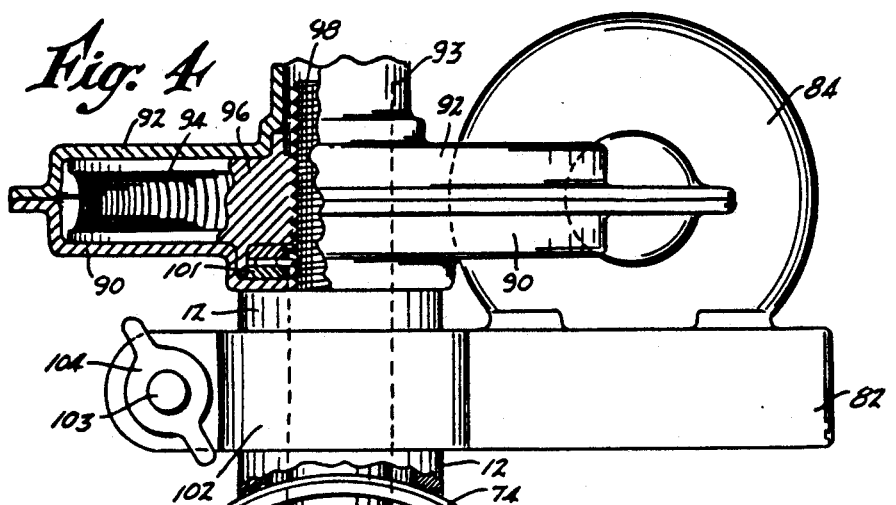
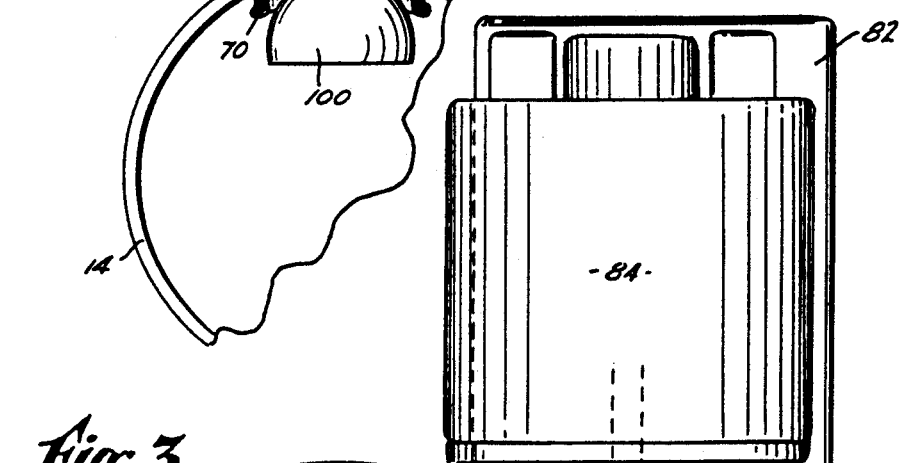
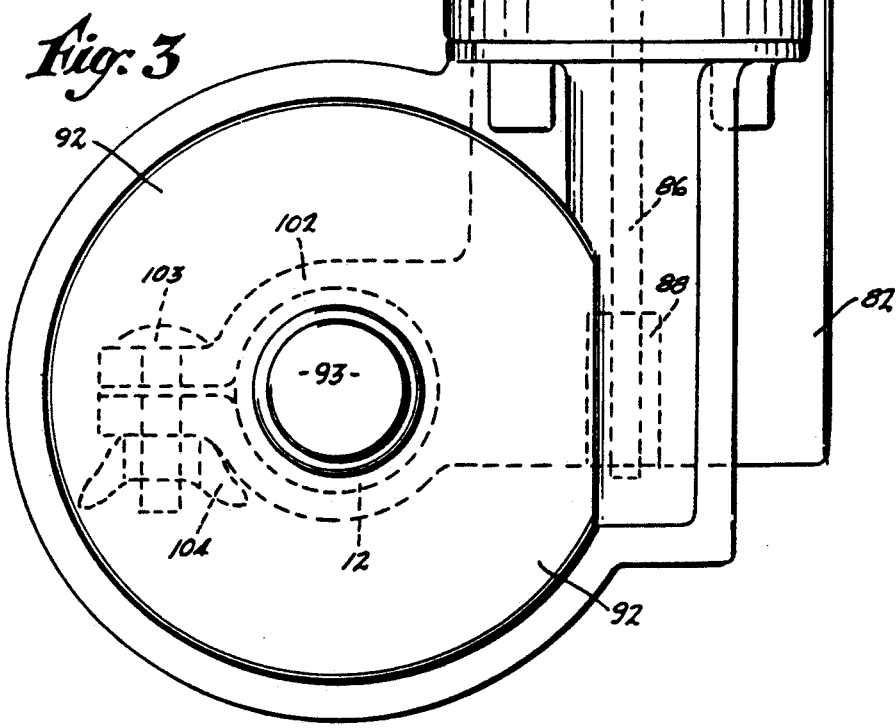

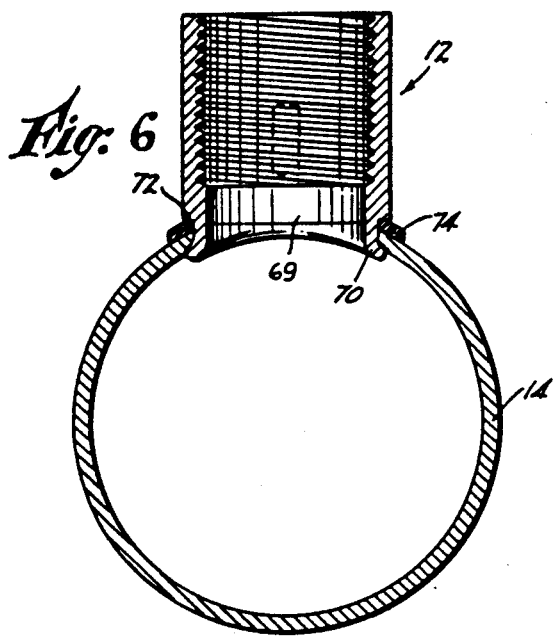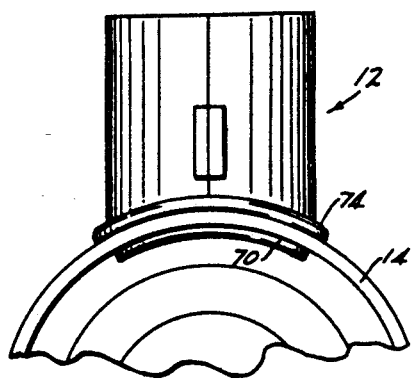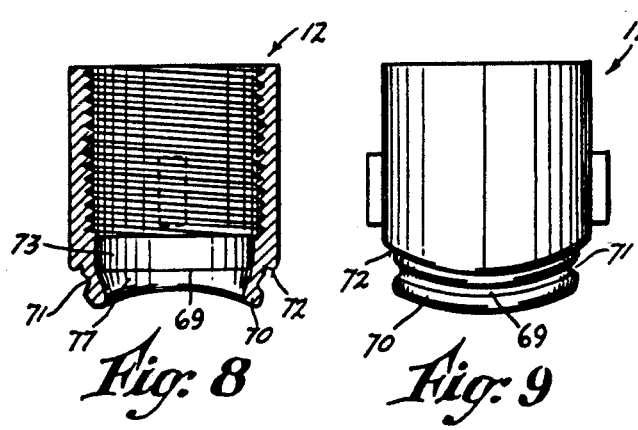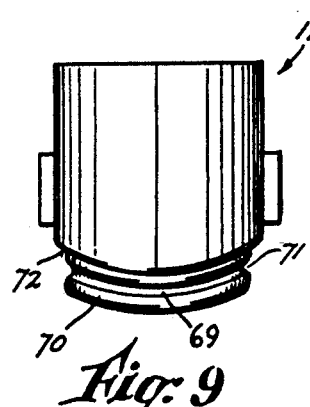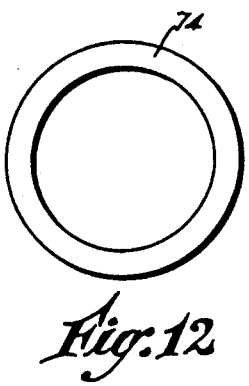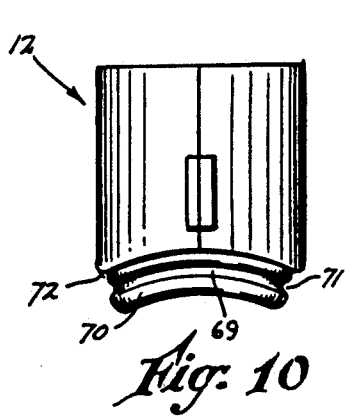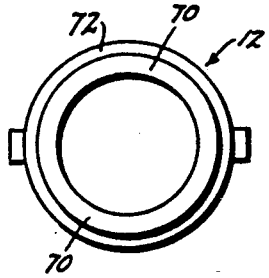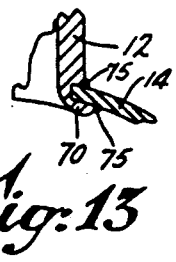

5,088,194

FLUID DISTRIBUTION SYSTEM, AND APPARATUS AND METHOD FOR MAKING SAME

CROSS REFERENCES TO RELATED APPLICATIONS

The present application is a continuation-in-part of my co-pending application U.S. Ser. No. 07/335,950 filed Apr. 10, 1989 now abandoned.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to improvements in branch pipe systems, and more particularly in the pipe outlet invention and fittings disclosed and claimed in my U.S. Pat. No. 4,541,656 issued Sept. 17, 1985, and entitled CAST METAL OUTLET FITTING.

2. Description of the Related Art

In the patent above identified a cast metal outlet fitting having at one end a fishmouth configuration, was secured to a distribution pipe by positioning the fitting over a hole in the pipe, with the use of criss-crossed positioning marks scribed on the pipe and cooperable positioning lugs on the outlet fitting. By such an arrangement a precise location of the the fitting over the hole was made possible; thereafter, welding material was applied at the junction of the fishmouth configuration and pipe so as to form both a mechanical connection and a permanent leak-resistant seal between the two parts. Preferably the other end of the fitting was threaded in order to accept a coupling (not shown) enabling the attachment of additional pipe sections thereto.

While the disclosed arrangement operated in a satisfactory manner and provided reliable results as far as maintaining the integrity of the connection and seal between the pipe and fitting was concerned, the use of welding for establishing the connection had distinct drawbacks.

In particular, in many installations such as laboratories and the like, the presence of combustible gases made use of welding equipment prohibitive, due to the danger of explosion. In the case of "clean rooms" which are employed to assemble and test certain types of electronic, mechanical, and medical equipment, welding would contaminate the clean environment. In addition, welding equipment was generally bulky and heavy to transport, and required a suitable source of electricity for operation. In some instances, as where a new building was under construction, electric power was not readily available, which required that a portable source be employed.

Finally, there existed the need for on-site skilled personnel, usually certified welders, in order to perform the necessary work. All of the above factors contributed to increased costs and inflexibility as to installation. Since much of the installation had to be accomplished "on site" where the distribution system was to be employed, it was usually not feasible to pre-assemble the required piping networks at the factory and then transport them to the particular facility for installation.

An article "How To Weld Pipe, Comprehensive Instructions for Cutting and Welding Pipe, and for Fabricating Pipe Fittings", published by the Linde Air Products Company, Unit of Union Carbide and Carbon Corporation, New York, N.Y., 1943, page 18, FIG. 43, illustrates a method of applying markings to a distribution pipe and outlet fitting, employing paper templates, to facilitate accurate positioning of the fitting prior to welding. This arrangement was solely applicable to welded or soldered joints.

A number of patented distribution and coupling arrangements have been devised in the past. As examples, reference is made to U.S. Pat. No. 1,801,171 illustrating the use of solder between a male and female member in order to provide the desired mechanical retention and pressure-resistant seal. U.S. Pat. No. 1,823,549 illustrates various types of T-couplings employing solder to assemble the various parts. Welded couplings are illustrated in U.S. Pat. Nos. 1,936,805; 1,966,403; 2,015,246; 2,463,006; 2,915,324; and 3,516,692.

A pipe fitting incorporating a sealing O-ring between a coupling and plug is illustrated in U.S. Pat. No. 2,954,604. The O-ring was concealed in a recess on the interior surface of a collar associated with the plug. The disclosed construction was intended for use with hydraulic pressure systems.

SUMMARY OF THE INVENTION

The above disadvantages and drawbacks of welded pipe distribution systems are largely obviated by the present invention, which has for one object the provision of a novel and improved distribution pipe system which is extremely simple in construction, especially inexpensive, reliable in operation, and which completely eliminates the need for welding or soldering operations of any kind.

A related object of the invention is to provide an improved distribution pipe system in accordance with the foregoing, which can be readily installed on-site and without the need for special electrical welding equipment or the skills of certified welding personnel.

Still another object of the invention is to provide an improved distribution pipe system as outlined above, which is mechanically strong and highly resistant to failure due to breakage, leakage, or the like.

Yet another object of the invention is to provide an improved distribution pipe system as above set forth, wherein securement of an outlet/inlet fitting is accomplished solely by mechanical retention, and without the need for welds, solder, or chemical sealing compounds.

A still further object of the invention is to provide an improved pipe distribution system of the kind indicated, wherein the assembly is greatly simplified and is capable of being carried out more rapidly than that required for conventional welded distribution pipe systems.

Yet another object of the invention is to provide a novel and improved method of assembly of an inlet/outlet fitting to a distribution pipe, which method can be readily carried out by relatively unskilled personnel, with a minimum of special equipment and without encountering hazards normally associated with electrical welding apparati and the like.

A further object of the invention is to provide improved, greatly simplified apparati for quickly and easily installing an inlet/outlet fitting in a hole in a distribution pipe, which apparati are capable of being safely used in practically any environment, even laboratories and the like where there exist explosive gases that might be susceptible of inadvertent ignition.

In accomplishing the above objects the invention provides a unique distribution system for carrying fluids, comprising in combination a pipe having a circular opening in its wall, and a cylindrical branch fitting constituted of deformable metal, wherein the fitting has a fishmouth configuration at one end, such end being disposed in the hole of the the pipe. A circumferential bead on the fitting end extends into the hole past the edges thereof, and is thereafter radially expanded or laid over against the edges of the hole in order to mechanically interlock and retain the fitting on the pipe in sealing relation.

The invention further provides a novel method for assembling a cylindrical fitting constituted of deformable metal to a pipe, wherein the pipe has a hole in its wall and the fitting has a fishmouth configuration at one end, and wherein the end of the fitting has a circumferential bead whose dimension is slightly less than the diameter of the hole, the method comprising the steps of inserting the fishmouth configuration of the fitting into the hole in the pipe to a depth wherein the bead of the fitting lies within the edges of the hole, and forcibly expanding and deforming the bead to bring it into tight engagement with and overlay the edges of the hole, thereby to physically retain the fitting on the pipe in sealing interlocking relation therewith The invention also provides apparati or fixtures for joining a deformable cylindrical fitting to a pipe, wherein the pipe has a hole in its wall and the fitting has a fishmouth configuration at one end, and wherein the fishmouth configuration has a circumferential bead whose dimension is slightly less than the size of the hole. In one form, an apparatus comprises a base including a cradle for supporting the main pipe with its hole facing upward, and means carried by the base, including an expansion member capable of extending through the fitting. The expansion member has an expansion head characterized by a dimension slightly less than the inner diameter of the fitting, and means are provided for forcibly drawing the expansion head upward through the deformable fitting so as to forcibly expand its fitting bead and bring it into firm engagement with the edges of the hole in the pipe, thereby to secure the fitting to the pipe and provide a seal between the fitting and the edges of the hole in the pipe.

The construction of the product thus provided avoids costly and time-consuming welding/soldering operations, and permits use of the method in environments which would otherwise not lend themselves to welding equipment, such as where flammable gases are present, or where no source of electricity is readily available, as in the case of new buildings that are only just initially under construction. The product and method of the invention are especially useful in the installation of fire-extinguishing sprinkler systems in offices, buildings, laboratories, and the like.

Other features and advantages will hereinafter appear.

BRIEF DESCRIPTION OF THE DRAWINGS

FIG. 3 is a top plan view of a modified apparatus or fixture for joining a fitting to a distribution pipe, including an electric motor carried on a base which can be releasably clamped onto the fitting for effecting installation of the latter into a hole in a pipe, this construction constituting another embodiment of the invention.

FIG. 4 is a front view, partly in elevation and partly in vertical section, of the apparatus of FIG. 3, particularly showing a two-part housing in which there is disposed a worm wheel that is driven by a worm carried on the motor shaft, and wherein the worm wheel has an internally threaded bore engageable with a pull rod carrying a bulbous expansion head, for effecting expansion of the lower end of the fitting.

FIG. 5 is a fragmentary front elevation of an upward tubular extension on the upper housing part of the apparatus of FIG. 4, the extension carrying an internal limit switch to open-circuit the motor after the expansion head has deformed the lower end of the fitting.

FIG. 6 is a vertical section of the novel and improved distribution system of the invention, comprising a pipe having a hole in its side wall, and a fitting installed thereon by means of a forcible expansion of the lower end of the fitting into firm engagement with the edges of the hole.

FIG. 7 is a fragmentary end elevation of the pipe and fitting of FIG. 6.

FIG. 8 is a vertical section of the fitting per se.

FIG. 9 is a front elevation of the fitting of FIG. 8.

FIG. 10 is a side elevation of the fitting of FIGS. 8 and 9.

FIG. 11 is bottom plan view of the fitting of FIGS. 8–10.

FIG. 12 is a top plan view of a resilient sealing gasket adapted to be interposed between an abutment shoulder of the fitting and the outer surface of the pipe at the hole, to effect an improved seal between the fitting and pipe, and FIG. 13 is a fragmentary sectional detail of a joint, illustrating a modification of the invention, using a viscous sealant.

DESCRIPTION OF THE PREFERRED EMBODIMENT

Figure 1:
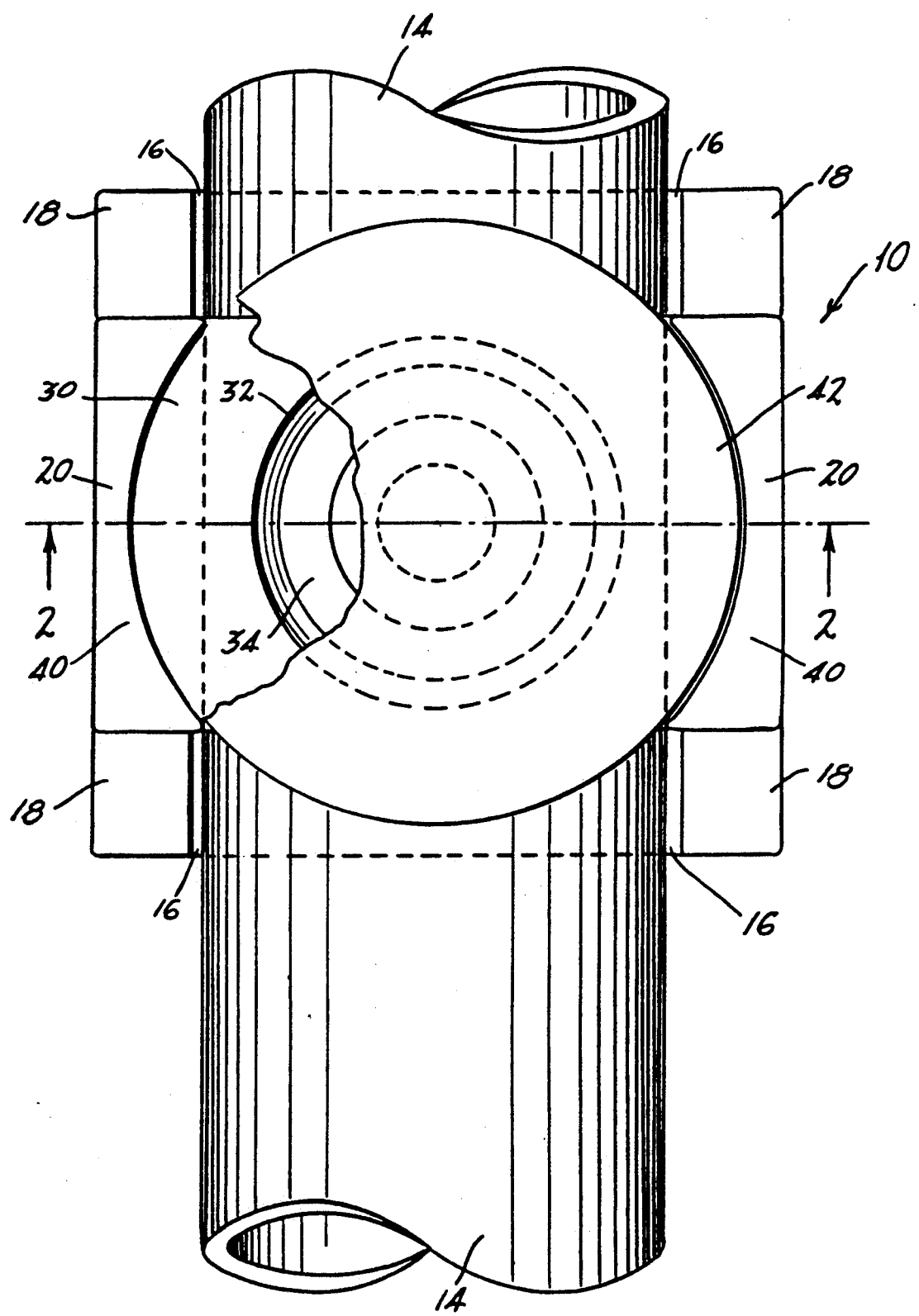
FIG. 1 is a top plan view, partly broken away, of a novel apparatus or fixture for joining a fitting to a distribution pipe by means of a forcible mechanical expansion of one end of the fitting, the apparatus being constructed in accordance with the principles of the present invention.
Figure 2:
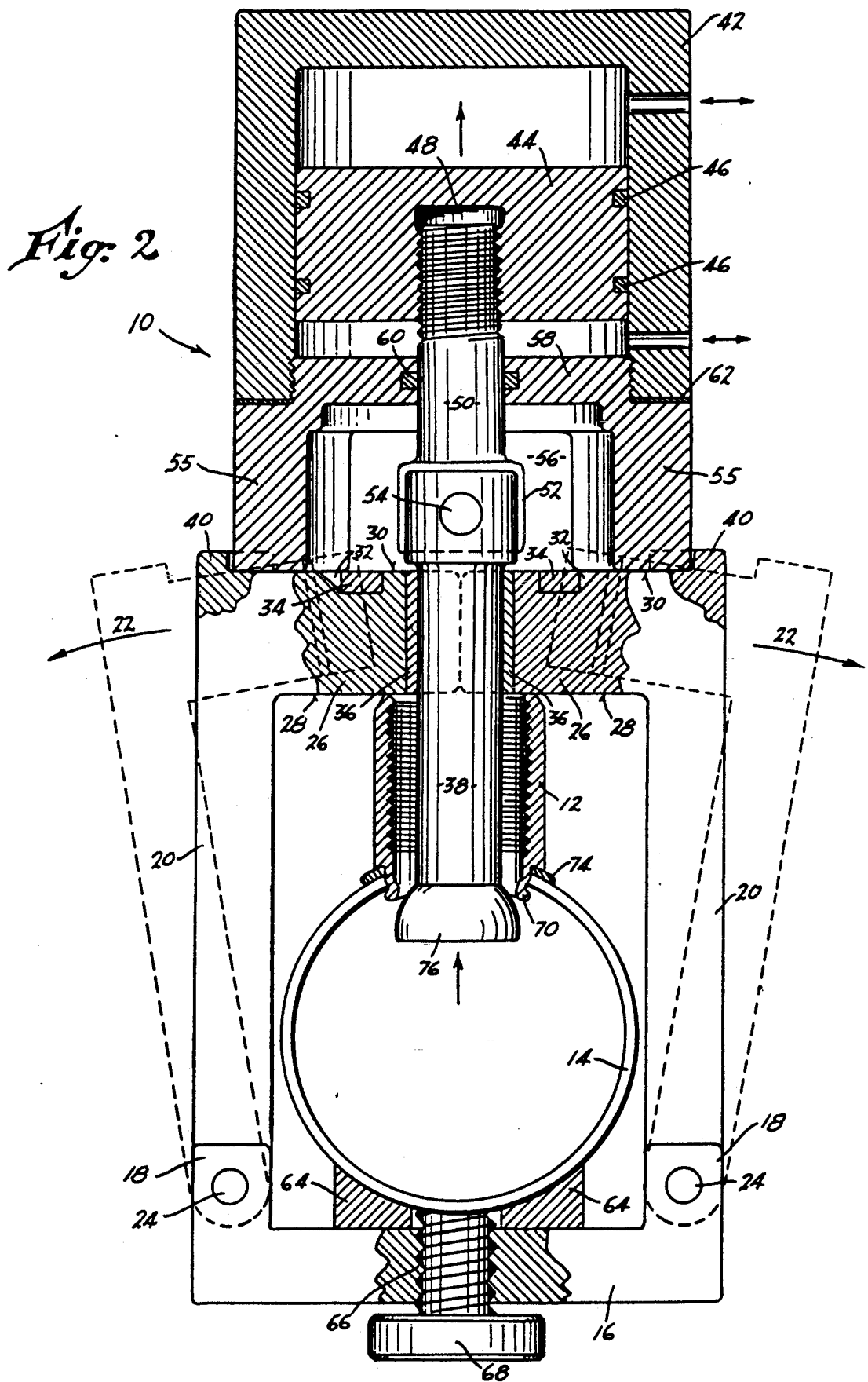
FIG. 2 is a section taken on the line 2—2 of FIG. 1, particularly illustrating the pipe and fitting, and including details of the apparatus which comprises a piston and cylinder, and a pull rod having a bulbous expansion head at its lower end for effecting forcible expansion of this end of the fitting.

Referring first to FIGS. 1 and 2 and in accordance with the present invention there is illustrated a novel and improved apparatus or fixture for effecting a mechanical attachment of an inlet/outlet fitting to a distribution pipe, the apparatus being generally designated by the numeral 10. The inlet/outlet fitting 12 and pipe 14 are shown in FIG. 2, as well as in FIGS. 6 and 7.

The apparatus 10 comprises a base 16 having four upstanding ears 18, FIGS. 1 and 2, on which are pivotally mounted two retainer arms 20 capable of being manually swung between the solid outline position of FIG. 2 (hereinafter referred to as the closed position), and the dotted outline position thereof, all as indicated by the curved arrows 22 of this figure. The dotted outline position is hereinafter referred to as the open position of the arms 20. Pins 24, pivotally link the arms 20 to the ears 18. At the upper ends of the arms 20 are lateral or transversely extending abutment shoulders 26. Taken together, with the retainer arms 20 in the solid line positions of FIG. 2, the abutment shoulders 26 form two yoke halves. Each yoke half has an undersurface 28 against which the upper end of the fitting 12 can bear, as will be explained below. In the upper surfaces 30 of the abutment shoulders 26 are semi-circular grooves 32 into which an annular retainer ring 34 can be inserted, in order to hold the abutment shoulders 26 in the solid outline positions after the fitting 12 has been applied to the pipe 14. Each yoke half carries a semi-cylindrical sleeve bearing half 36, for sliding engagement with a pull rod 38.

At the peripheries of the upper surfaces of the abutment shoulders 26 are a pair of arcuate positioning flanges 40 which when together form a seat for a removable piston/cylinder assembly. The cylinder housing of the assembly is indicated at 42, whereas the piston is labelled 44. The piston 44 has conventional rings 46, and has a threaded bore 48 which receives a piston rod 50. The lower end of the piston rod 50 terminates in a tongue 52, constituting part of a pin and slot, pulling connection. The other part of the pin and slot connection comprises the pull rod 38 which at its upper, headed end has a transverse slot, and a cross pin 54. The cylinder has a head 58, a sealing ring 60 carried in the head and engageable with the piston rod 50, and a pair of depending arcuate-section legs 55 between which there exists a clearance space 56 by which access can be had to the cross pin 54. The head 58 is threaded into the piston housing 42 as shown, with a sealing gasket 62 therebetween.

Referring again to FIG. 2, carried by the base 16 is an apertured hollow cradle 64 having an arcuate upper surface with a curvature generally to match that of the 0. D. of the pipe 14 or to generally engage and position the pipe. The cradle 64 can be permanently secured to the base 16. The base 16 further has a threaded bore 66 to accommodate a hand screw 68, which freely extends through the aperture in the cradle 64, as in FIG. 2, for effecting positioning of the pipe 14 with respect to the closed retainer arms 20, and to forcibly hold the fitting 12 against the opening in the wall of the pipe.

Referring to FIGS. 2, 6, 8 and 9, and in accordance with the invention the fitting 12 is constituted of deformable material, and has a circumferential bead 70 in an extension 69 at its lower end beyond a groove 71 forming a thin wall section or zone of weakness in the extension 69, the diameter of the bead being just slightly less than the diameter of the hole in the pipe wall, such that the fitting 12 can be readily inserted in the hole in the pipe 12. The lower end of the fitting also has an annular abutment shoulder 72 having a dimension substantially greater than the diameter of the hole, so as to constitute a positioning means for the fitting. Preferably a sealing ring 74 of metal or synthetic or other suitable material, with or without viscous sealant such as Locktite or equivalent, FIG. 12, is interposed between this shoulder and the outer surface of the pipe, such that a pressure-tight seal is ultimately obtained when the attachment of the fitting to the pipe is completed. FIG. 13 shows a joint without the ring 74, sealed with the aid of a synthetic viscous sealant 75. As shown in FIG. 8, the bore 73 of the fitting converges to a smaller diameter at the fishmouth, formed by a substantially conical surface 77. This convergence is eliminated when the fishmouth is expanded as shown in FIG. 6, as will be explained below.

Further by the invention, the lower end of the pull rod 38 terminates in a bulbous tapered expansion head 76, preferably having the semi-spherical configuration as shown in FIG. 2; the head 76 is especially given this semi-spherical configuration, spherically increasing in its dimension from top to bottom to a figure that is greater than the I. D. of the circumferential bead 70, so that the wedging or expanding action is most powerful at the termination of the working stroke because the angularity becomes least at that time.

In order to install the fitting 12 in the hole of the pipe 14, referring to FIG. 2, the piston 50 and pull rod 38 are initially disconnected at the pin and slot connection 52, 54. The piston 44 and cylinder 42 are thus normally disassembled from the arms 20, with the arms 20 being disposed in the open position. The space between the open arms 20 permits the pipe 14 to be positioned on the cradle 64, with its opening facing upwardly. The pull rod 38 and expansion head 76 are inserted into a fitting 12 through that end thereof having the fishmouth configuration, and the assembly of fitting 12, pull rod 38 and expansion head 76 then inserted into the hole in the pipe 14. It is noted that the diameter of the unexpanded bead 70 is sufficiently small to permit its insertion into the pipe hole. Thereafter, the arms 20 are manually swung to the closed position and the retainer ring 34 placed in the grooves 32, to securely hold the arms 20 together. Then the piston 44 and cylinder 42 are placed on the arms 20 as in FIG. 2, between the flanges 40, and the cross pin 54 installed to join the piston rod 50 and pull rod 38. The thumb screw 68 is then securely tightened in order to raise the pipe 14 slightly such that the upper end of the fitting 12 snugly engages the undersurfaces 28 of the shoulders 26, and the fitting 12 is forcibly, properly seated in the hole of the pipe 14.

Hydraulic or pneumatic pressure is then applied to the lower port of the cylinder 42, causing the expansion head 76 to be raised upwardly. The bulbous configuration of the head 76 causes it to engage the bead 70 of the fitting 12, and to forcibly expand the latter radially outward into engagement with the edges of the hole in the pipe 14. Continued upward movement will cause the expansion head 76 to enter the interior of the fitting 12, after which the pressure in the cylinder 42 can be released. By the invention, the bead 70 is thus swaged over the edge of the hole, to form a mechanically tight and pressure-tight seal. The gasket 74 improves the seal by undergoing a slight compression as the bead 70 is initially deformed.

Following this, the cross pin 54 is removed, the piston 44 and cylinder 42 removed, and the retainer ring 34 removed, after which the arms 20 can be manually swung outwardly, to their open positions. The pipe 14 and fitting 12 are then accessible, and can be removed from the fixture or base 16.

The advantage of the convergence noted above is that it enables the fitting to be installed in (i.e. the bead 70 can fit through or clear) the edge of the hole in the pipe 14, while still permitting the tool part 76, FIG. 2, to be withdrawn after it deforms the fitting to the shape of FIG. 6. Without this convergence, the tooling required to flare out the bead 70 as in FIG. 6 would be considerably more complex than the relatively simple pull rod 38 and expansion head 76 employed by applicant.

Installation of subsequent fittings can then be accomplished in a similar manner. All that is required is that the pipe be provided with the proper size holes in its wall, at the locations desired.

It is to be understood that the base 16 and cradle 64 of the apparatus just described would be employed with a given range of pipe diameters. Other pipe ranges might require the use of a fixture having slightly different dimensions for both the base and cradle carried thereby.

Another embodiment of the invention is shown in FIGS. 3-5, illustrating a simplified fixture for installing a fitting 12 in the hole of the wall of a pipe 14. This fixture, indicated 80, comprises a base 82 on which there is mounted an electric motor 84. The motor shaft 86 carries a worm 88, and there is mounted on the base a two-part housing 90, 92 for a worm wheel 94. The two parts of the housing have radial abutting flanges secured to one another by suitable bolts, not shown. The worm wheel 94 has teeth engaged by the worm 88, and includes a hub portion 96 having a threaded bore. A threaded pull rod 98 is received in the threaded bore, and carries an expansion head 100 similar to that of the first embodiment. A thrust bearing 101 is disposed between the hub 96 and the lower housing part 90, FIG. 4.

The base 82 is preferably releasably secured to the fitting 12 as in FIGS. 3 and 4 by a bracket 102, bolt 103 and wing nut 104. The upper portion 93 of the housing 92 is tubular, FIG. 5, and carries an internal limit switch 106 arranged in the motor circuit, such that when the pull rod 98 is raised, the upper, threaded end thereof eventually engages the limit switch 106, turning off the motor so as to prevent jamming of the rod 98 within the housing 90, 92. Suitable reversing switching circuitry (not shown) of conventional design can be employed to return the pull rod 98 to a starting position.

In use, the pull rod 98 is first removed from the housing and inserted into that end of the fitting 12 having the fishmouth configuration. The pull rod can then be manually threaded into the hub 96 of the worm wheel 94 with the fitting carried thereon, and the bracket 102 tightened around the outside of the fitting 12. The parts will have the relative positions shown in FIG. 4 at this point. Operation of the motor 84 will cause a forcible retraction of the pull rod 98 and its expansion head 100, causing its engagement with the deformable bead 70 of the fitting 12 to expand the bead. The bead 70 will thus be swaged over the edge of the hole in the pipe 14, and become mechanically secured thereto, as well as being hydraulically sealed thereto. Following the expansion of the bead 70, the bracket 102 can be loosened, and the assembly of bracket 102, motor 84, housing 92, 94, pull rod 98 and expansion head 100 can be completely withdrawn from the upper end of the fitting 12, making the fixture ready for the next installation.

FIGS. 6 and 7 show the bead 70 in its deformed, expanded position, tightly gripping the edge portions of the hole in the pipe 14, whereas FIGS. 8-10 show the fitting 12 with the bead 70 prior to its having been radially expanded.

Referring again to FIG. 2, the novel steps involved with the assembly of a fitting to a pipe can be summarized as follows:

A method for assembling a cylindrical fitting 12 constituted of deformable metal to a pipe 14, wherein the pipe has a hole in one wall and the fitting has a fishmouth configuration at one end, and wherein the one end of the fitting has a circumferential bead 70 whose dimension is less than the diameter of the hole, comprising the steps of inserting the fishmouth configuration of the fitting 12 into the hole in the pipe 14 to a depth wherein the bead 70 lies within the edges of the hole, and thereafter forcibly expanding and deforming the bead 70 to bring it into tight engagement with the edges of the hole, thereby to physically retain the fitting 12 on the pipe 14 in sealing relation therewith. In most instances, the axis of the fitting will be perfectly perpendicular to the axis of the pipe, i.e. the fitting and pipe will thus form a T-configuration.

Advantageously, the fitting has an abutment in the form of an annular shoulder 72 at the one end, and the method would thus include the further step of placing a sealing member 74 against the shoulder 72 prior to inserting the fishmouth configuration into the hole of the pipe 14. Preferably the method also embraces compressing the sealing member 74 between the shoulder 72 an the outer surface of the wall of the pipe during the expansion of the bead 70.

In carrying out the method, there is employed an expansion head 76, FIG. 2, to expand the bead 70, which expansion head is inserted into the fitting 12 through that end having the fishmouth configuration. An abutment 26, 28 is placed against the other end of the fitting 12, and the expansion head 76 is then pulled into the fitting 12 from that end having the fishmouth configuration, so as to force the bead 70 radially outward as the head by-passes the bead.

The movement of the expansion head 76 can be carried out by means of the fluid powered piston 44 and cylinder 42 or by means of the electric motor 84 and step-down gearing 88, 94.

More specifically, the method involves the steps of inserting the pull rod 38 into the fishmouth configuration of the fitting with the expansion head 76 outside the fitting, inserting the fishmouth configuration of the fitting, together with the inserted pull rod and expansion head, into the hole in the pipe to a depth wherein the bead 70 lies within the edges of the hole, and positioning a holding means comprising shoulders 26 against the fitting, and forcibly withdrawing the pull rod and expansion head through the fishmouth configuration of the fitting so as to forcibly expand and deform the bead to bring it into tight, sealing engagement with the edges of the hole and to simultaneously expand the relatively smaller, convergent bore comprising the conical surface 77, by an amount sufficient to enable the expansion head to by-pass the bead and to enter the interior of the fitting and subsequently be withdrawn therefrom together with the pull rod, thereby physically retaining the fishmouth configuration of the fitting in the hole in the pipe so as to be in tight sealing relation therewith.

The disclosed apparatus and product have the following advantages, which the devices of the prior art did not enjoy. First, no welding or soldering operations are required, making the procedure completely safe for use in environments which would not lend themselves to use of such equipment. Such environments include laboratories containing flammable gases, or research and development facilities requiring extreme cleanliness, as in the case of electronic equipment assembly areas of the type known as "clean rooms", for example microchip fabrication plants.

In addition, no skilled labor is required as in welding operations, where often a certified welder must be employed to perform the various tasks.

Also, the present arrangement has a distinct advantage in that it can be carried out in less time and with less effort than would be the case with weld/solder operations. Moreover, the integrity of the connection between the fitting and pipe is considered to be superior; inspection of welds for flaws is thus completely eliminated.

The disclosed product, apparati and method are thus seen to constitute a distinct advance and improvement in the field of fluid distribution systems.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A method for assembling a cylindrical fitting constituted of deformable metal to a pipe, wherein the pipe has a hole in a side wall and the fitting has a fishmouth, said one end of the fitting has a circumferential external bead whose dimension is less than the diameter of the pipe hole and further said one end of the fitting has a convergent bore that tapers to a smaller dimension toward one end, and wherein an apparatus is provided for accomplishing said method, said apparatus including means for engaging and holding said fitting, and a pull rod having an expansion head, said pull rod and expansion head being movable with respect to the holding means, said expansion head having an external dimension which exceeds the smallest dimension of the convergent bore of the fitting, prior to assembly, the method comprising the steps of:

a) inserting the pull rod into the bore of the fishmouth configuration of the fitting with the expansion head outside the fitting, b) inserting the fishmouth configuration of the fitting, together with the inserted pull rod and expansion head, into the hole in the pipe to a depth wherein the bead lies within the edges of the hole, and positioning the holding means against the fitting, and c) forcibly withdrawing the pull rod and expansion head completely through the fishmouth configuration of the fitting thereby forcibly expanding and deforming the bead and bringing it into tight, sealing engagement with the edges of the hole and expanding the relatively smaller, convergent bore by an amount sufficient to enable the expansion head to by-pass the bead and to enter the interior of the fitting and subsequently to be completely withdrawn therefrom together with the pull rod, thereby physically retaining the fishmouth configuration of the fitting in the hole in the pipe in tight sealing relation therewith.

2. The method of claim 1, wherein the fitting has an annular shoulder at said one end, and including the further step of:

a) placing a sealing member against the said shoulder prior to inserting the fishmouth configuration into the hole of the pipe.

3. The method of claim 2, and including the further step of compressing the sealing member between the said shoulder and the outer surface of the wall of the pipe during the expanding step of the bead.

4. The method of claim 1, wherein:

a) the forcible withdrawal of the pull rod and expansion head is carried out by means of a fluid powered piston and cylinder.

5. The method of claim 1, wherein:

a) the forcible withdrawing of the expansion head is carried out by means of an electric motor and stepdown gearing comprising a worm wheel having a threaded bore in which the pull rod is threaded.

* * * * *